Oct. 18, 1927.
E. R BURTNETT
1,645,797
INTERNAL COMBUSTION ENGINE
Filed Nov. 3, 1924
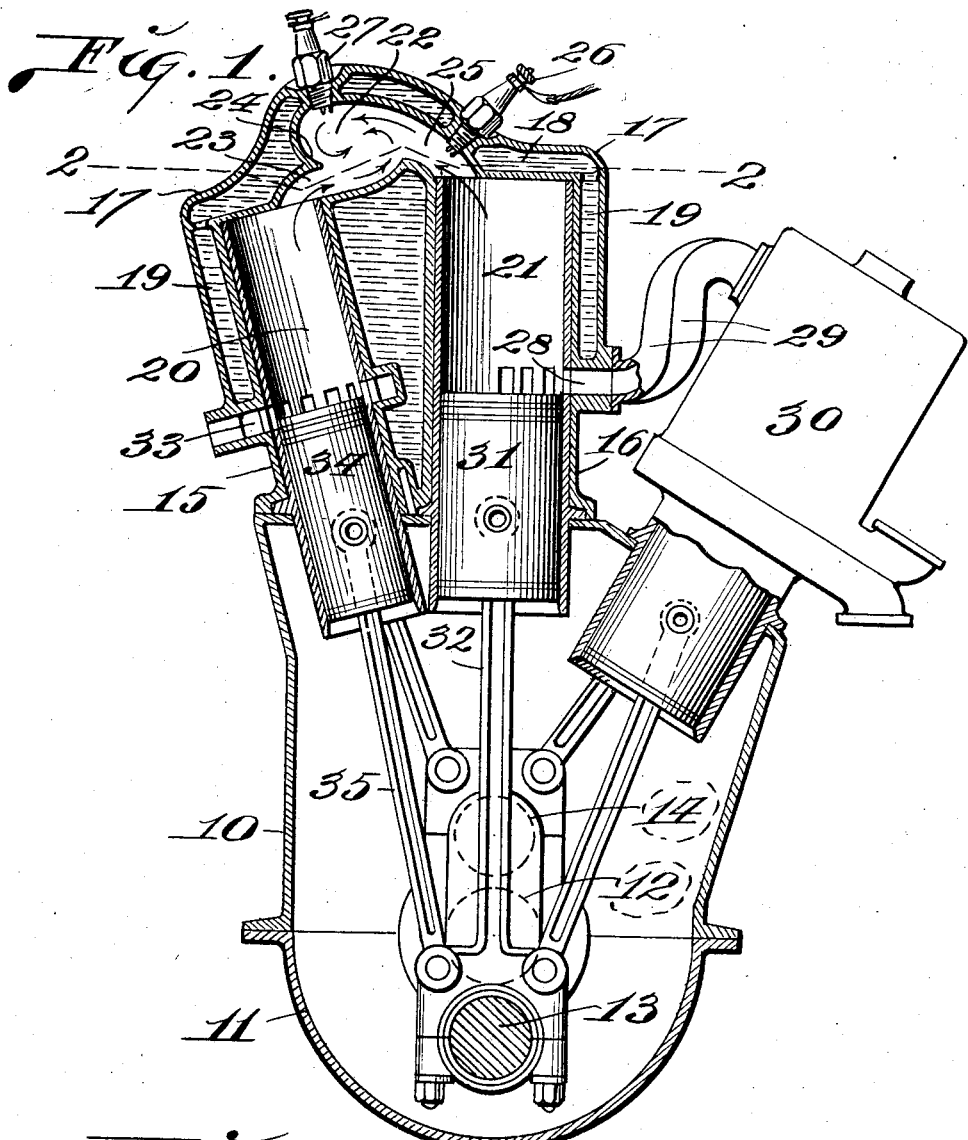
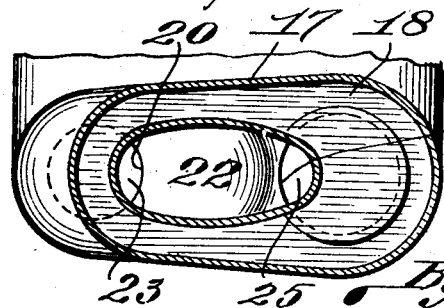

Patented Oct. 18, 1927.

1,645,797

UNITED STATES PATENT OFFICE.

EVERETT R. BURTNETT, OF LOS ANGELES, CALIFORNIA, ASSIGNOR, BY DIRECT AND MESNE ASSIGNMENTS, TO THE AUTOMOTIVE VALVES CO., OF LOS ANGELES, CALIFORNIA, A VOLUNTARY TRUST.

INTERNAL-COMBUSTION ENGINE.

Application filed November 3, 1924. Serial No. 747,442.

My invention relates generally to internal combustion engines of the type disclosed in U. S. Letters Patent No. 1,501,393 issued July 15, 1924 to me and my assignee, Homer A. Brunell, the principal object of my invention being, to provide, in the head of the combustion cylinders of the engine, which cylinders are arranged so that their axes are angularly disposed with respect to each other, a combined compression and combustion chamber, that connects and functions as a common clearance space for the chambers within the combustion cylinders and within which common clearance space, the combined residual and fresh gaseous fuel charge is caused to be highly agitated, thereby effecting a thorough and intimate mixture of said residual and fresh gaseous fuel throughout the compression stroke of the pistons within the two combustion cylinders.

Inasmuch as the clearance within the head is common to the two combustion cylinders, the forcing of the compressed charge of residual and fresh gases into said clearance chamber produces a high degree of turbulence within said common chamber, and as a result of such condition, the rapidity of flame propagation through the entire charge after ignition will be materially increased and, further, the thorough mixture of the residual products of combustion and fresh fuel gases will tend to decrease combustion temperatures and, consequently, reduce the tendency of the charge to detonate.

To accomplish the desired results, I form within the head of the engine a substantially oval chamber that is common to the angularly disposed chambers of the engine and locate one charge igniting device immediately adjacent to the compressed fuel charge outlet from the combustion chamber to which the fresh fuel charge is inducted, and another igniting device being located in the upper portion of the turbulence chamber. This arrangement accomplishes a satisfactory and uniform firing of the fuel charge at all times, regardless of load or gaseous fuel mixture ratio to the volume of residual gases remaining in the combined combustion cylinders and clearance as an initial volume. Since the relatively small quantity of fresh gaseous fuel needed for idling or for light load operation will be inducted and remain in a stratum directly over the piston of the cylinder in which the inlet ports are located, and as said small quantity of gaseous fuel will not reach the vicinity of the clearance chamber where the charge is being agitated, until the very end of the compression stroke and at the time of ignition of the gaseous fuel charge, the flow of clean gaseous fuel will be undiluted by the relatively great volume of residual gases remaining in the cylinder at light loads and pass directly across the ignition device that is located at the opening between the cylinder having the inlet ports and the common clearance chamber.

When the engine load is increased and any appreciable volume of fresh fuel is inducted in proper ratio to the residual volume, the gaseous mixture excepting the small quantity located directly over the piston within the chamber having the fuel inlet ports will enter the clearance chamber as early, during the compression stroke of the pistons, as the ratio of inducted charge of gaseous fuel is in volume to the total piston displacement. Hence, as the engine load is increased and the gaseous fuel charge volume increases, a relative and properly proportioned increase and mixture of the gaseous fuel with the residual gases will be produced in the common clearance and combustion chamber, and which mixture will be ignited by the sparks produced by the ignition device that is seated in the cylinder head directly above the main body portion of the turbulence chamber.

With the foregoing and other objects in view, my invention consists in certain novel features of construction and arrangement of parts that will be hereinafter more fully described and claimed and illustrated in the accompanying drawings in which:

Fig. 1 is a vertical section taken lengthwise through the axes of the three radially arranged cylinders of my improved engine and with the head of the two combustion cylinders provided with the common clearance and turbulence chamber contemplated by my invention.

Fig. 2 is a horizontal section taken on the line 2—2 of Fig. 1.

Referring by numerals to the accompanying drawings, 10 and 11 designate respectively the upper and lower parts of the crank case, the end walls thereof being provided with suitable bearings for a shaft 12 having two throws or cranks 13 and 14.

Secured to the upper portion of the crank case member 10 and in the same radial plane with the center of crank 13 are two cylinders 15 and 16 that are angularly disposed with respect to each other, so that their axes are radially arranged relative to the crank shaft 12.

Cylinder 16, which is the second cylinder in the direction of crank shaft rotation, occupies a substantially vertical position directly above the axis of the crank shaft and cylinder 15, which is the first cylinder in the direction of crank shaft rotation occupies an angular position immediately to the side of said cylinder 16.

Formed integral with, or fixed to the head ends of the radially disposed combustion cylinders 15 and 16 is a head block 17, the wall of which is formed with cooling fluid circulation chambers 18 that are preferably in communication with similar chambers 19, that are formed in the upper portions of the walls of cylinders 15 and 16.

Formed in head block 17 and between the head ends of the combustion chambers 20 and 21 within the cylinders 15 and 16 is a chamber 22 that is substantially oval in form, and which functions as a common clearance and turbulence chamber for the two combustion chambers 20 and 21. Leading from the upper end of chamber 20 into the lower portion of turbulence chamber 22, is a short horizontally disposed throat 23, the same being tangentially disposed with respect to the lower portion of the turbulence chamber, and formed between the upper portion of the inner end of this throat and the corresponding end of turbulence chamber 22 is an inwardly projecting lip or flange 24.

Leading from the upper portion of combustion chamber 21 upwardly and toward chamber 22 is a short curved throat 25 that is tangential with respect to the upper curved surface of the turbulence chamber.

Seated in head 17 immediately above this throat 25 is a spark plug 26, the inner ends of the terminals of the electrodes of which project into said throat 25 at a point just above the upper end of the combustion chamber 21. Seated in head 17 above the highest point within the turbulence chamber 22 is a spark plug 27, the terminals of the electrodes of which project into the highest portion of said turbulence chamber 22.

Cylinder 16 is provided with a gaseous fuel inlet port 28, to which is connected a transfer duct 29 that leads from a pumping cylinder, such as 30.

For a more complete understanding of the construction and operation of the engine to which my improved turbulence head is applied, reference may be had to my patent hereinbefore referred to.

Arranged for reciprocatory movement within combustion chamber 21 is a piston 31, the same being connected to crank shaft 13 by a connecting rod 32. Cylinder 20 is provided with exhaust ports 33, and arranged for operation within the chamber in said cylinder is a piston 34 that is connected to the lower portion of rod 32 by a connecting rod 35.

Gaseous fuel inlet ports 28 and exhaust ports 33 are located so that they are uncovered and open while the pistons 31 and 34 are at the lower or outer ends of their stroke, and when so positioned a charge of fresh gaseous fuel enters inlet port 28 from the pumping cylinder that serves the connected pair of combustion cylinders 15 and 16, and this fuel charge passes upwardly through chamber 21, thence through throat 25 into turbulence chamber 22, thence through throat 23 into and through combustion chamber 20 and in thus passing through the combustion chambers and the turbulence chamber said charge of gaseous fuel will drive before it a substantial portion of the products of combustion remaining in the combustion chambers from the previously ignited charge and these burnt gases and products of combustion will be forced out through the exhaust port 33.

Inlet port 28 and exhaust port 33 are closed shortly after the pistons 31 and 34 start on their inward or upward travel, and the gaseous fuel charge admitted to the connected combustion chambers and the turbulence chamber will be forced into the latter and compressed therein as the combustion pistons move to the upper or inner ends of their stroke.

As piston 31 moves upward or inward the gaseous fuel charge will be forced through throat 25 into the upper portion of the turbulence chamber, and due to the oval shape of the latter the gases will be caused to whirl within said chamber, and this whirling agitation or turbulence is enhanced by the gaseous fuel charge and residual products of such combustion that are forced upwardly through throat 23 by the upwardly moving piston 34, with the result that the inducted charge of fresh fuel will be thoroughly mixed with the residual products of combustion and compressed within the turbulence chamber during the entire upward or inward travel of the pistons 31 and 34.

At the point of highest compression, or as the pistons pass their high centers, sparks will be produced simultaneously between the inner ends of the electrodes of plugs 26 and 27, thereby igniting the compressed gaseous fuel charge at two different points so as to insure rapid flame propagation through the compressed gases and the rise in pressure following combustion of the compressed charge will be directed against the heads of pistons 31 and 34 to move the same downward on their power stroke.

The location of a spark plug in the throat 25 insures ignition of the compressed gaseous fuel charge while the engine is idling or running with light loads for as gaseous fuel is admitted to chamber 21 within which piston 31 is located, a stratum of comparatively rich and undiluted gaseous fuel will always remain directly over the head of said piston, and this stratum is the last to enter the throat 25 while piston 31 is at top center.

Thus it will be seen that I have provided a relatively simple, practical and efficient turbulence head for a two stroke cycle internal combustion engine, wherein the combustion cylinders occupy angular positions with respect to each other or where the upper ends of the combustion cylinders are spaced a greater distance apart than their lower ends. It will be understood that minor changes in the size, form and construction of the various parts may be made in my invention as shown and described without departing from the spirit thereof, and within the scope of the appended claims.

I claim as my invention:

1. In a two stroke cycle internal combustion engine, a pair of combustion cylinders, one arranged directly in front of the other in the direction of crank rotation of said engine, one of said cylinders having a gaseous fuel inlet port, the other cylinder having an exhaust port, a head closing the chambers within said cylinders, a substantially oval-shaped chamber formed in said head above and between the upper ends of the combustion chambers, there being an upwardly curved duct formed in said head and leading from the side of the combustion chamber in the cylinder having the gaseous fuel inlet ports to the adjacent end of the oval-shaped chamber in the head and there being a relatively short horizontally disposed duct formed in the underside of the head and leading from the upper end of the combustion chamber having the exhaust port to the lower central portion of said oval-shaped chamber in the cylinder head.

2. In a two stroke cycle internal combustion engine, a pair of combustion cylinders, one arranged directly in front of the other in the direction of crank rotation of said engine, one of said cylinders having a gaseous fuel inlet port, the other cylinder having an exhaust port, a head closing the chambers within said cylinders, a substantially oval-shaped chamber formed in said head above and between the upper ends of the combustion chambers, there being an upwardly curved duct formed in said head and leading from the side of the combustion chamber in the cylinder having the gaseous fuel inlet ports to the adjacent end of the oval-shaped chamber in the head, ignition means seated in the head and projecting into said duct, there being a relatively short horizontally disposed duct formed in the underside of the head and leading from the upper end of the combustion chamber having the exhaust port to the lower central portion of said oval-shaped chamber in the cylinder head and ignition means seated in the head and projecting into the end of the oval-shaped chamber directly above the inner end of said short duct.

In testimony whereof I affix my signature.

EVERETT R. BURTNETT.